United States Patent
Hamilton (10) Patent No.: US 6,324,637 B1
(45) Date of Patent: Nov. 27, 2001

(54) APPARATUS AND METHOD FOR LOADING OBJECTS FROM A PRIMARY MEMORY HASH INDEX

(75) Inventor: Graham Hamilton, Palo Alto, CA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 09/374,158

(22) Filed: Aug. 13, 1999

(51) Int. Cl.⁷ .................................................. G06F 12/00
(52) U.S. Cl. ........................................................ 711/216
(58) Field of Search ................................ 711/216, 202

(56) References Cited

U.S. PATENT DOCUMENTS

| | | | |
|---|---|---|---|
| 5,742,807 | 4/1998 | Masinter | 395/601 |
| 5,754,844 | 5/1998 | Fuller | 395/606 |
| 5,809,494 * | 9/1998 | Nguyen | 707/1 |
| 5,911,144 * | 6/1999 | Schwartz et al. | 707/206 |
| 5,944,781 * | 8/1999 | Murray | 709/202 |
| 6,044,079 * | 3/2000 | Calvignac | 370/395 |
| 6,055,538 * | 4/2000 | Kessenich et al. | 707/101 |
| 6,067,547 * | 5/2000 | Douceur | 707/100 |
| 6,145,064 * | 11/2000 | Long et al. | 711/158 |

* cited by examiner

Primary Examiner—Kevin Verbrugge
(74) Attorney, Agent, or Firm—Pennie & Edmonds LLP (57) ABSTRACT

A method of loading objects from primary memory includes the step of creating hash values for listed objects to create a hash index specifying a set of hash values. The hash index is loaded into primary memory to form a primary memory hashed index object directory. A calculated hash value is derived for an invoked object. The calculated hash value is matched with a hash value in the primary memory hashed index object directory. In response to this matching operation, an object corresponding to the calculated hash value is loaded into primary memory.

14 Claims, 6 Drawing Sheets

APPARATUS AND METHOD FOR LOADING OBJECTS FROM A PRIMARY MEMORY HASH INDEX

BRIEF DESCRIPTION OF THE INVENTION

This invention relates generally to accessing software objects in an object oriented software environment. More particularly, this invention relates to a technique for reducing the primary memory footprint associated with the process of accessing software objects.

BACKGROUND OF THE INVENTION

Figure 1:
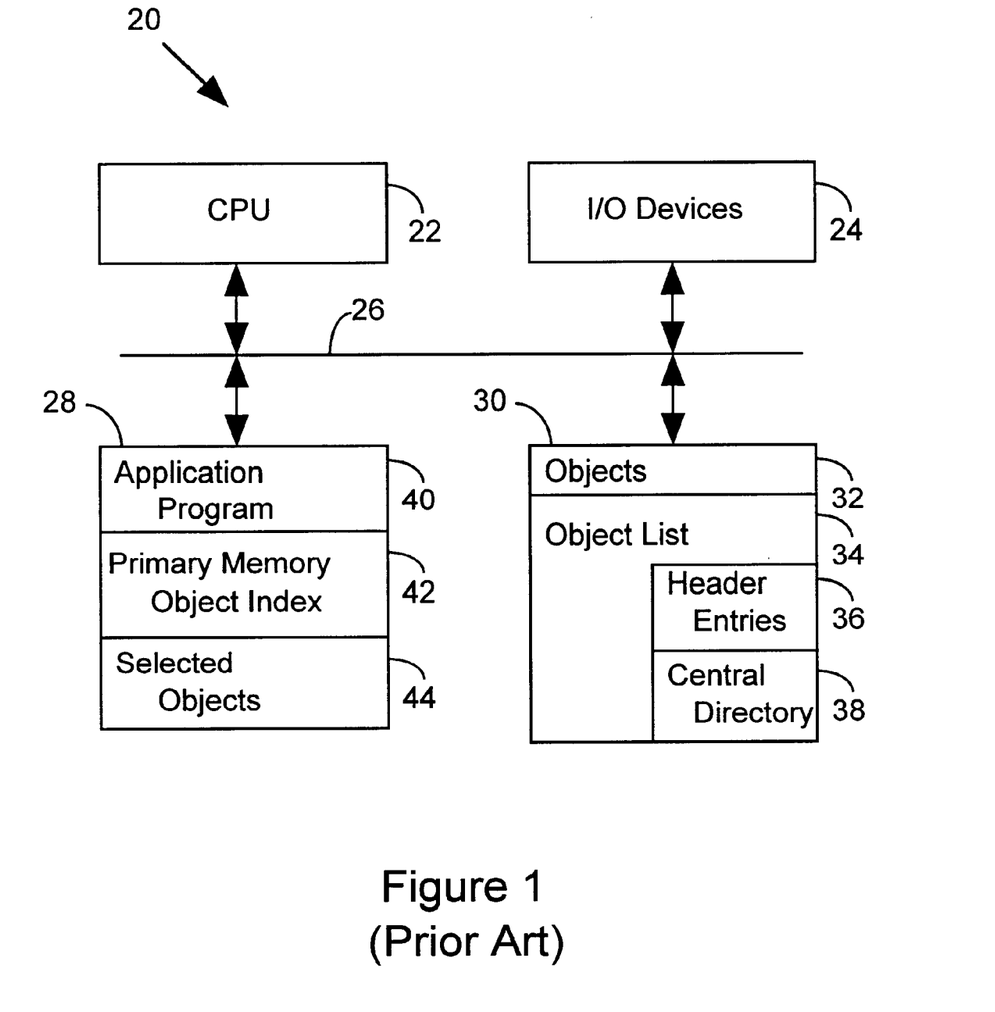
FIG. 1 illustrates a prior art computer with a relatively large primary memory object index.

FIG. 1 illustrates a computer 20 constructed in accordance with the prior art. The computer 20 includes a central processing unit 22, which communicates with a set of input/output devices (e.g., keyboard, mouse, video monitor, printer, and the like) 24 over a system bus 26. Also connected to the system bus is a primary memory (e.g., volatile memory, such as a RAM) 28 and a secondary memory (e.g., mass storage, such as a disk) 30. The secondary memory stores a set of software objects 32. The software objects 32 are characterized by an object list 34, which includes header entries 36 and a central directory 38, which provides a short-hand characterization of the header entries 36.

An application program 40 stored in primary memory 28 is executed by the central processing unit 22. The application program 40 invokes objects 32 to perform specified functions. In particular, the application program 40 accesses a primary memory object index 42, which basically corresponds to the object list central directory 38, as discussed below. The primary memory object index 42 allows the application program 40 to identify and load invoked objects 32 stored in secondary memory 30. After being invoked, the selected objects 44 are resident in primary memory 28.

Figure 2:
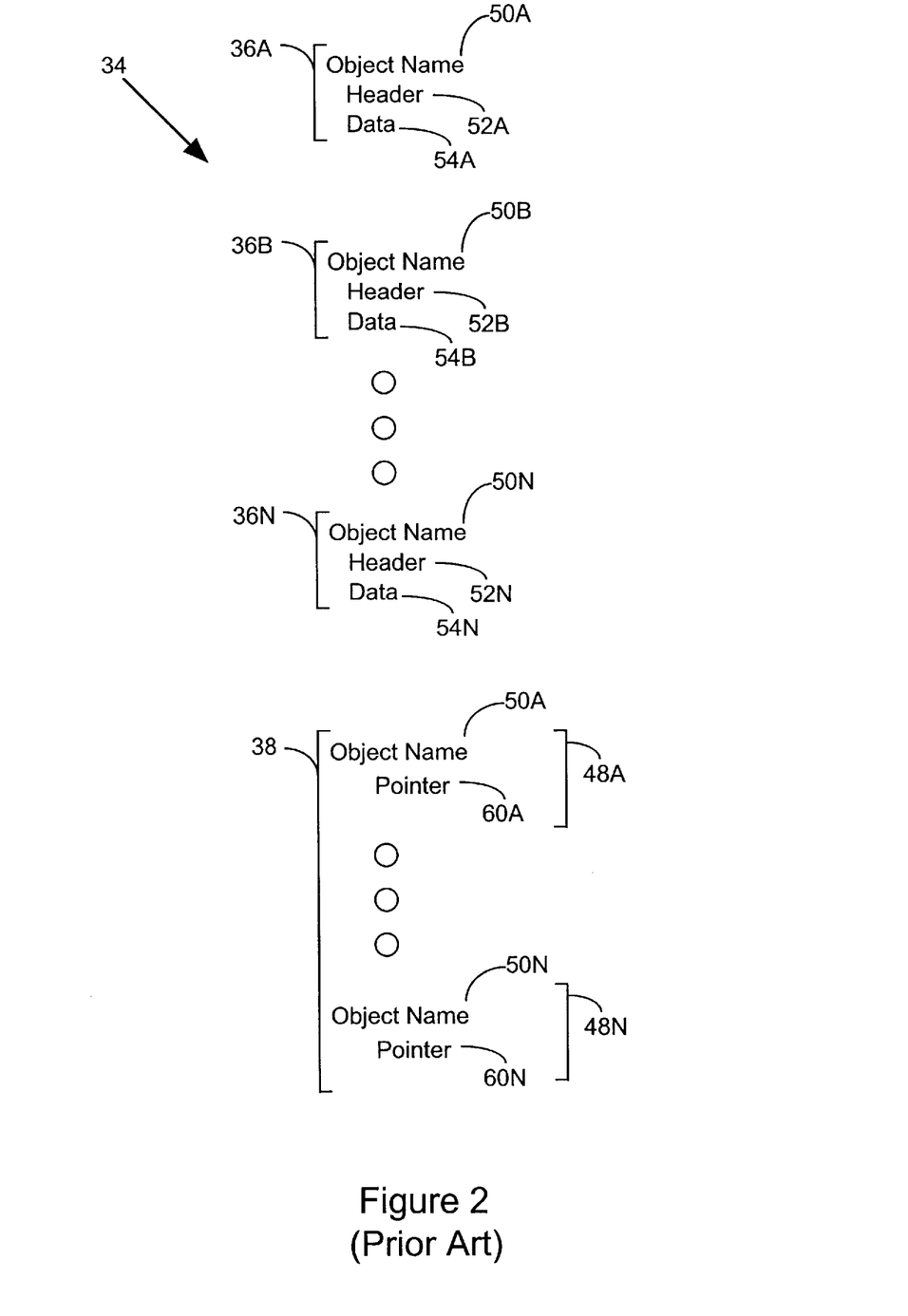
FIG. 2 illustrates the form of an object list in accordance with the prior art.

FIG. 2 illustrates an object list 34 in accordance with the prior art. The object list 34 includes a set of object list entries 36A–36N. Each entry includes an object name 50, a header 52, and data 54. The header 52 includes information, such as object version, general purpose bit flags, compression method information, a cyclic redundancy check of uncompressed data, compressed data size, uncompressed data size, filename length, and the like. The data 54 includes the instructions or other information associated with the object. Since each entry 36 can be relatively large, a central directory 38 is associated with the object list 34. The central directory includes a set of central directory entries 48A–48N corresponding to the object list entries 36A–36N. Each central directory entry 48 includes an object name 50 and a pointer 60 to the location of the corresponding object list entry 36.

As previously indicated, the primary memory object index 42 is typically implemented as the central directory 38 of the object list 34. The problem with this approach is that the central directory 38 can be relatively large because it includes such information as the object name, the object's location, and miscellaneous information about the object. It is well known that the performance of a computer is largely contingent upon its efficient use of primary memory. An oversized primary memory object index can lead to inferior computer performance.

The foregoing problem is more fully appreciated in connection with a specific example. JAVA™ is a well known computer language developed and licensed by Sun Microsystems, Inc., Mountain View, Calif., the assignee of the present invention. An application program 40 written in JAVA™ is supported by a large object list. The central directory 38 of the object list 34 is scanned through a bootclasspath or application classpath, resulting in the construction of the primary memory object index 42. The resultant primary memory object index 42 is relatively large.

The JAVA™ Development Kit (JDK™) is an object list 34 which contains the software and tools that developers need to compile, debug, and run applets and applications written using the JAVA™ programming language. Java Archive (JAR) is a platform-independent file format that aggregates many files into one. Multiple JAVA™ applets and their requisite components (e.g., class files, images and sounds) can be bundled in a JAR file and subsequently downloaded to a web browser in a single Hypertext Transport Protocol (HTTP) transaction, greatly improving the download speed. The utility "java.util.jar" provides classes for reading and writing the JAR file format. The JAR file format is based on a "ZIP" file format that is used in JAVA™. The utility "java.util.zip" provides classes for reading and writing the standard ZIP and GZIP file formats. Some of the classes associated with "java.util.zip" that are used by "java.util.jar" include: DeflaterOutputStream, which is a class to implement an output stream filter for compressing data in the "deflate" compression format; InflaterinputStream, which is a class to implement a stream filter for uncompressing data in the "deflate" compression format; ZipEntry, which is a class to represent a ZIP file entry, ZipFile, which is a class to read entries from a zip file; and ZipException, which is a class to handle exceptions. Some of the classes that are used by "java.util.zip" include: checksum, which is an interface representing a data checksum; CRC32, which is a class that can be used to compute the thirty-two bit cyclic redundancy check of a data stream; and ZipEntry, which is a class used to represent a ZIP file entry.

In JDK 1.2, for each ZIP or JAR file on the bootclasspath or application classpath, the file's central directory 38 is scanned and a primary memory object index 42 is built. In the prior art, all of the information from the central directory 38 is loaded into primary memory 28. This includes the name of the ZIP entry, it's offset in the ZIP file, and about 24 bytes of additional information. This results in about 4,500 ZIP entries in a primary memory object index 42 that takes up approximately 424 KB. This relatively large primary memory footprint is expected to grow as additional classes are added to support JAVA™.

In view of the foregoing, it would be highly desirable to provide a technique for loading objects from a primary memory index that has a relatively small primary memory footprint. Such a technique could be used, for example, to reduce the primary memory footprint of the ZIP index for the core JAVA™ classes. Such a technique could also be used for applications that use large JAR files.

SUMMARY OF THE INVENTION

A method of loading objects from primary memory includes the step of creating hash values for listed objects to create a hash index specifying a set of hash values. The hash index is loaded into primary memory to form a primary memory hashed index object directory. A calculated hash value is derived for an invoked object. The calculated hash value is matched with a hash value in the primary memory hashed index object directory. In response to this matching operation, an object corresponding to the calculated hash value is loaded into primary memory.

A computer readable medium has an index generator with executable instructions to create hash values for listed objects, thereby creating a hash index specifying a set of hash values. The index generator loads the hash index into primary memory to form a primary memory hashed index object directory. An object loader has executable instructions to derive a calculated hash value for an invoked object. The object loader matches the calculated hash value with a hash value in the primary memory hashed index object directory. In response to a match, the object loader loads into primary memory an object corresponding to the calculated hash value.

The invention provides a technique for loading objects from a primary memory index that has a relatively small primary memory footprint. The technique of the invention is advantageously used to reduce the primary memory footprint of the ZIP index for the core JAVA™ classes. The technique can also be exploited for applications that use large JAR files.

BRIEF DESCRIPTION OF THE DRAWINGS

For a better understanding of the invention, reference should be made to the following detailed description taken in conjunction with the accompanying drawings, in which.

Like reference numerals refer to corresponding parts throughout the drawings.

DETAILED DESCRIPTION OF THE INVENTION

Figure 3:
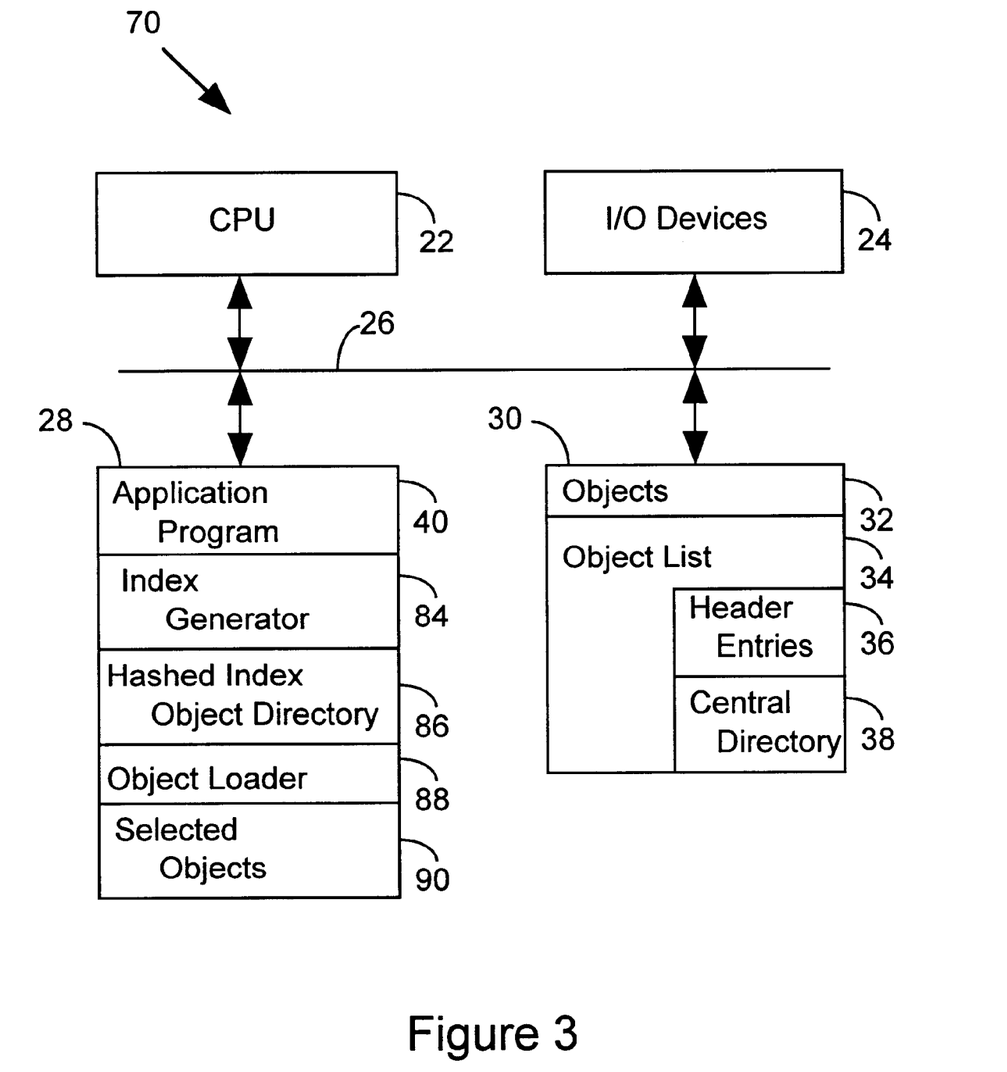
FIG. 3 illustrates a computer system with a hashed index object directory in accordance with the present invention.

FIG. 3 illustrates a computer 70 constructed in accordance with an embodiment of the invention. The computer 70 includes many of the components of the prior art computer 20 of FIG. 1. In particular, the computer 70 includes a central processing unit 22, which communicates with a set of input/output devices (e.g., keyboard, mouse, video monitor, printer, and the like) 24 over a system bus 26. Also connected to the system bus 26 is a primary memory (e.g., volatile memory, such as a RAM) 28 and a secondary memory (e.g., mass storage, such as a disk) 30. The secondary memory 30 stores a set of software objects 32. The software objects 32 are characterized by an object list 34, which includes header entries 36 and a central directory 38, which provides a short-hand characterization of the header entries 36.

An application program 40 stored in primary memory 28 is executed by the central processing unit 22. The application program 40 invokes objects 32 to perform specified functions. The structure and features of the computer 70 discussed up to this point are consistent with the computer 20 of FIG. 1. However, the computer 70 of FIG. 3 relies upon a different technique for loading objects. In particular, the primary memory 28 of the computer 70 includes an index generator 84, which is used to produce a primary memory hashed index object directory 86 that has a relatively small primary memory footprint. As discussed below, the primary memory hashed index object directory 86 has a hash value for each object name. This hash value represents a substantially more compact representation of the object name. The primary memory 28 also has an object loader 88. The object loader 88 processes the hashed index object directory 86 to selectively load objects that are utilized by the application program 40. FIG. 3 also illustrates selected objects 90, which were loaded in reliance upon the primary memory hashed index object directory 86 of the invention.

The primary memory hashed index object directory 86 of the invention has a primary memory footprint that is approximately one quarter of the primary memory footprint associated with a primary memory object index 42 of the prior art. The invention has been implemented to reduce the primary memory footprint of the JDK ZIP file from approximately 424 KB to approximately 100 KB. Those skilled in the art will appreciate the importance of this savings of space in primary memory 28, especially in the case of relatively small applications running on relatively small platforms. The technique of the invention will become increasing important as the size of object lists, such as in the JDK, increase. The invention is successfully exploited in connection with large JAR files in which only a fraction of the entries are used.

Figure 4:
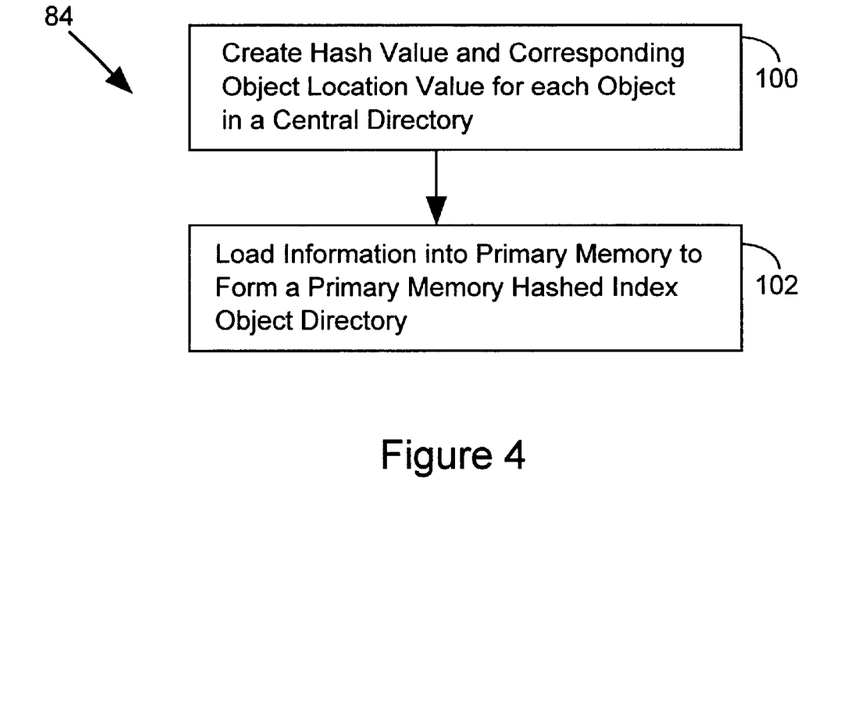
FIG. 4 illustrates processing steps associated with an index generator constructed in accordance with an embodiment of the invention.

The general nature and advantages of the invention have now been described. Attention presently turns to a more particular discussion of the invention. FIG. 4 illustrates processing steps associated with an index generator 84 of the invention. The first processing step associated with the index generator 84 is to create a hash value and corresponding object location value for each object in a central directory (step 100). In other words, the index generator scans a central directory 38 of an object list 34. Each object name 50 of the object list 34 is converted to a hash value. As known in the art, a hash function produces a hash value. A hash function partitions the domain of a function into k sections, with each section being associated with an index. Any number of well known hash functions may be used to produce a hash value of an object name 50 in accordance with the invention. After creating a hash value and a corresponding object location value for each object, the information is loaded into primary memory to form a primary memory hashed index object directory (step 102).

Figure 5:
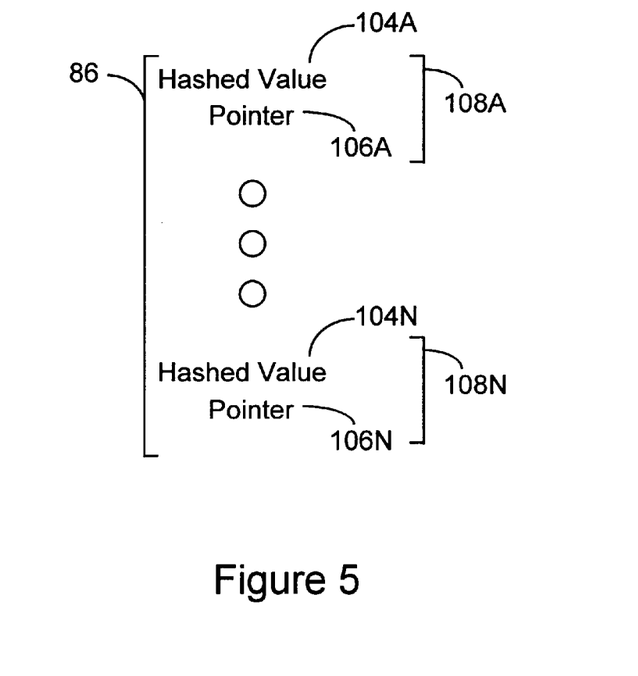
FIG. 5 illustrates a hashed index object directory constructed in accordance with an embodiment of the invention.

FIG. 5 illustrates a primary memory hashed index object directory 86 in accordance with an embodiment of the invention. The primary memory hashed index object directory 86 includes a set of hashed index entries 108A–108N. Each hashed index entry 108 includes a hashed value 104, which corresponds to an object name 50. Each hashed value 104 also has a pointer or a similar feature that provides direction toward more comprehensive information for the object.

Figure 6:
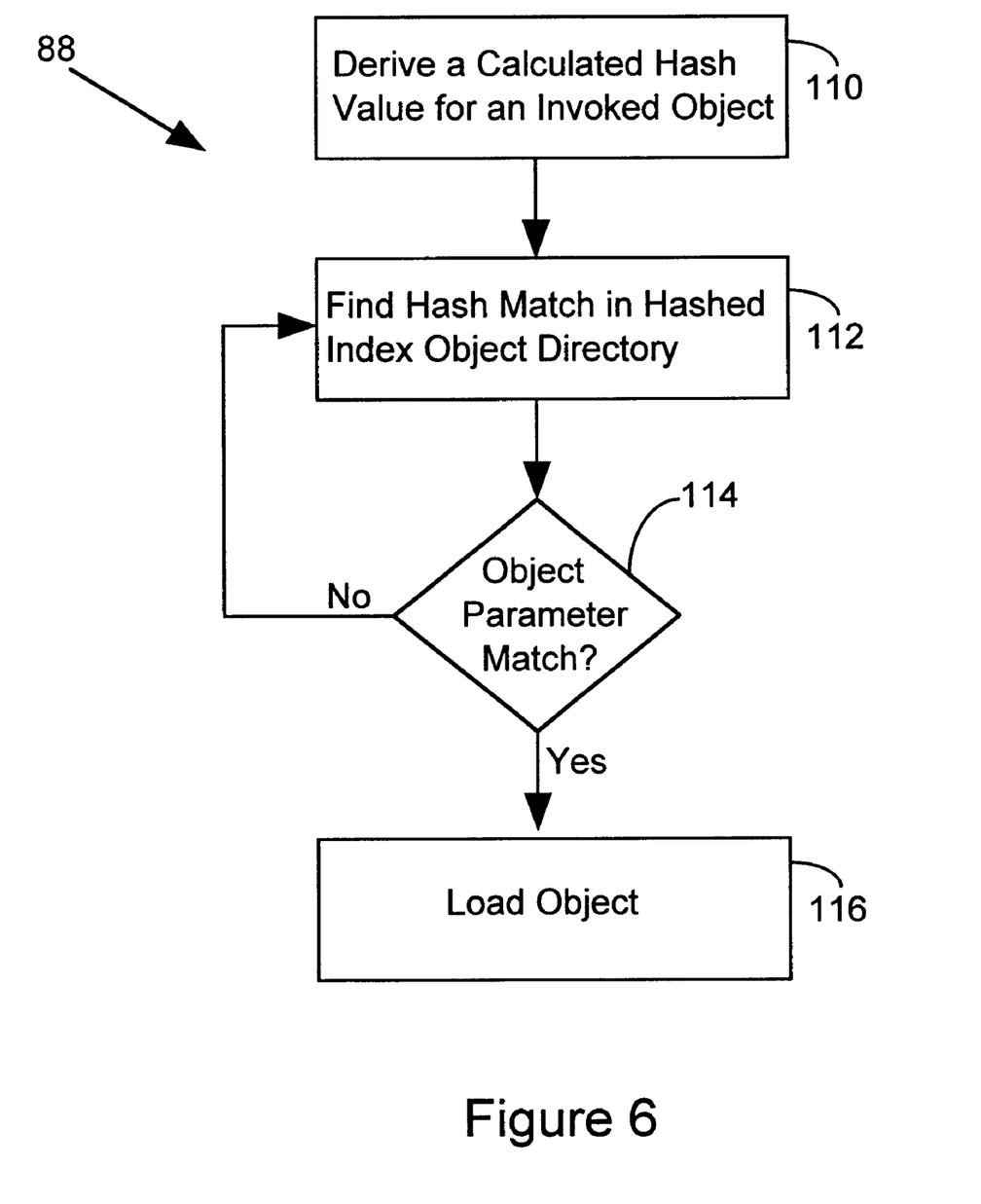
FIG. 6 illustrates an object loader constructed in accordance with an embodiment of the invention.

Once the hashed index object directory 86 is loaded into primary memory, the object loader 88 can rely upon it to load selected objects 90. FIG. 6 illustrates processing steps associated with an object loader 88 of the invention. The first processing step associated with the object loader 88 is to derive a calculated hash value for an invoked object (step 110). The calculated hash value is then matched to an entry in the primary memory hashed index object directory (step 112). After a hash match is identified, additional object parameter information is used to confirm the object corresponding to the hashed value is actually the invoked object (step 114). Thus, for example, the pointer 106 associated with each hashed value 104 may be used to identify header information 52B that can be used to confirm that the appropriate object has been selected. In the relatively rare case that a parameter match does not exist, processing returns to step 112, where a new hash match is identified.

When the object parameter match operation (step 114) is satisfied, the appropriate hashed value for the invoked object has been identified. In this case, the pointer 106 associated with the hashed value 104 is used to access the invoked object and load it into primary memory (step 116).

The invention has been implemented with a 32 bit hash function. False hits on the 32 bit hash code have been rare. While it is possible to occasionally have a false hit, this is not a performance problem in practice. Even in the case of a false hit, the proper object is found through the object parameter matching operation of step 114. Surprising, the object parameter matching operation of step 114 does not result in performance degradation stemming from an extra read operation to the header entry 36. The reason for this is that for the common cases, the technique of the invention does the same number of reads as the prior art approach. In the prior art, the central directory 38 gives a pointer to the start of each header 52. The headers 52 are variable length. Therefore, the prior art code must determine the header length and thus the actual start point of the relevant header information.

The invention operates more efficiently when the hashed index object directory 86 includes a cache cell to store the most recently referenced hashed value 104 and associated pointer 106. Preferably, the object loader 88 initially searches the cache cell to identify a hash match step 112). Object parameters are then checked (step 114) and the object is loaded (step 116). In practice, the cache cell of the hashed index object directory 86 realizes a relatively high hit rate.

Figure 7:
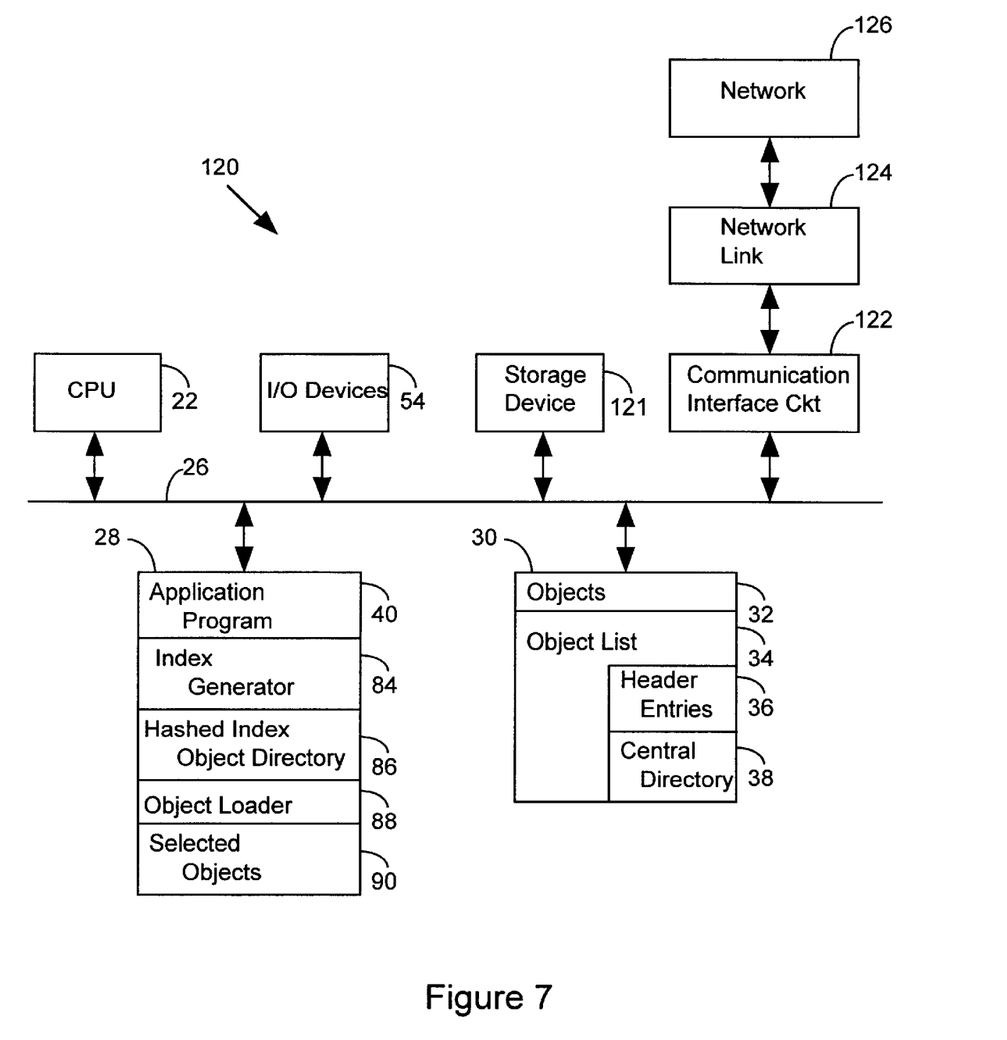
FIG. 7 illustrates a computer system with a hashed index object directory forming a portion of a computer network in accordance with an embodiment of the invention.

FIG. 7 illustrates an alternate apparatus 120 for practicing the invention. FIG. 7 corresponds to FIG. 3, but includes a storage device 121, a communications interface circuit 122, a network link 124, and a network 126. The programs stored in the primary memory 28 and secondary memory 30 may be downloaded from a computer readable medium associated with the storage device 121, or alternately, may be executed from the computer-readable medium associated with the storage device 121. The term "computer readable medium" refers to any medium that participates in providing instructions to the processor 22 for execution. Such a medium may take many forms, including but not limited to non-volatile media, volatile media, and transmission media. Non-volatile media includes, for example, optical or magnetic disks, associated with the storage device 121. Volatile media includes dynamic memory. Transmission media includes coaxial cables, copper wire and fiber optics, including the wires that comprise bus 26. Transmission media can also take the form of acoustic or light waves, such as those generated during radio-wave and infra-red data communications.

Common forms of computer readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described below, or any other medium from which a computer can read.

Various forms of computer readable media may be involved in carrying one or more sequences of one or more instructions to processor 22 for execution. For example, the instructions may initially be carried on a magnetic disk of a remote computer. The remote computer can load the instructions into its dynamic memory and send the instructions over a telephone line using a modem. A modem local to the computer system 120 can receive the data on the telephone line and use an infra-red transmitter to convert the data to an infra-red signal. An infra-red detector coupled to the bus 26 can receive the data carried in the infra-red signal and place the data on bus 26. The bus 26 then carries the data to primary memory 28 or secondary memory 30, from which the processor 22 retrieves and executes the instructions. The instructions may optionally be stored on the storage device 121 either before or after execution by the processor 22.

The computer system 120 also includes a communication interface circuit 122 coupled to the bus 26. The communication interface circuit 122 provides a two-way data communication coupled to a network link 124 that is connected to a network 126. For example, the communication interface circuit 122 may be an integrated services digital network (ISDN) card or a modem to provide a data communication connection to a corresponding type of telephone line. As another example, the communication interface circuit 122 may be a local area network (LAN) card to provide a data communication connection to a compatible LAN. Wireless links may also be implemented. In any such implementation, the communication interface circuit 122 sends and receives electrical, electromagnetic or optical signals that carry digital data streams representing various types of information.

The network link 124 typically provides data communication through one or more networks, represented by the network 126. For example, the network link 124 may provide a connection to a network 126 that includes a host computer operated as an Internet Service Provider (ISP). The ISP in turn provides data communication services through the world wide packet data communication network now commonly referred to as the "Internet". The network 126 uses electrical, electromagnetic or optical signals that carry digital data streams. The signals through the various networks and the signals on the network link 124 and through the communication interface circuit 122, which carry the digital data to and from the computer system 120, are exemplary forms of carrier waves transporting the information.

The computer system 120 can send messages and receive data, including program code, through the network 126, the network link 124, and the communication interface circuit 122. In the Internet example, a server on the network 126 may transmit a requested code for an application program through the network 126, the network link 124, and the communication interface circuit 122. The received code may be executed by the processor 22 as it is received and/or stored in the storage device 121, or other non-volatile storage for subsequent execution. In this manner, the computer system 120 may obtain application code in the form of a carrier wave.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A method of loading a software object into primary memory, said method comprising the steps of:
   creating a hash value for a listed object;
   combining said hash value with a listed object location value;
   repeating said creating step and said combining step to create a hash index specifying a plurality of hash values and corresponding listed object location values;
   loading said hash index into primary memory to form a primary memory hashed index object directory;
   deriving a calculated hash value for an invoked object;
   matching said calculated hash value with a hash value in said primary memory hashed index object directory; and
   loading into primary memory an object with a hash value in said primary memory hashed index object directory that matches said calculated hash value.

2. The method of claim 1 wherein said creating step includes the step of creating a hash value for a listed object in a central directory listing objects.

3. The method of claim 2 wherein said creating step includes the step of creating a hash value for a listed object in a central directory of a JAVA language ZIP format file.

4. The method of claim 3 wherein said creating step includes the step of creating a hash value for a listed object in a central directory of a JAVA Archive format file.

5. The method of claim 1 wherein said matching step includes the steps of:
   comparing said calculated hash value to hash values in said primary memory hashed index object directory to identify a hash match between said calculated hash value and a listed object hash value associated with a target object; and
   confirming that object parameter information for said invoked object matches object parameter information for said target object.

6. The method of claim 1 wherein said matching step includes the steps of:
   comparing said calculated hash value to hash values in said primary memory hashed index object directory to identify a hash match between said calculated hash value and a listed object hash value associated with a target object;
   identifying when object parameter information for said invoked object does not match object parameter information for said target object; and
   repeating said comparing step in response to said identifying step.

7. The method of claim 1 wherein said matching step includes the step of matching said calculated hash value with a hash value in a cache cell of said primary memory hashed index object directory.

8. A computer readable medium to coordinate the loading of an object into primary memory, comprising:
   an index generator with executable instructions including
      a first module to create a hash value for a listed object,
      a second module to combine said hash value with a listed object location value,
      a third module to invoke said first module and said second module to create a hash index specifying a plurality of hash values and corresponding listed object location values, and
      a fourth module to load said hash index into primary memory to form a primary memory hashed index object directory; and
   an object loader with executable instructions including
      a fifth module to derive a calculated hash value for an invoked object;
      a sixth module to match said calculated hash value with a hash value in said primary memory hashed index object directory; and
      a seventh module to load an object with a hash value in said primary memory hashed index object directory that matches said calculated hash value.

9. The apparatus of claim 8 wherein said first module includes executable instructions to create a hash value for a listed object in a central directory listing objects.

10. The apparatus of claim 9 wherein said first module includes executable instructions to create a hash value for a listed object in a central directory of a JAVA language ZIP format file.

11. The apparatus of claim 10 wherein said first module includes executable instructions to create a hash value for a listed object in a central directory of a JAVA Archive format file.

12. The apparatus of claim 8 wherein said sixth module includes executable instructions to:
   compare said calculated hash value to hash values in said primary memory hashed index object directory to identify a hash match between said calculated hash value and a listed object hash value associated with a target object; and
   confirm that object parameter information for said invoked object matches object parameter information for said target object.

13. The apparatus of claim 8 wherein said sixth module includes executable instructions to:
   compare said calculated hash value to hash values in said primary memory hashed index object directory to identify a hash match between said calculated hash value and a listed object hash value associated with a target object;
   identify when object parameter information for said invoked object does not match object parameter information for said target object; and
   repeat said compare operation in response to the identify operation.

14. The apparatus of claim 8 wherein said sixth module includes executable instructions to match said calculated hash value with a hash value stored in a cache cell of said primary memory hashed index object directory.

* * * * *